US009067690B2

(12) United States Patent
Pedigo et al.

(10) Patent No.: US 9,067,690 B2
(45) Date of Patent: Jun. 30, 2015

(54) CATALOGING SYSTEM FOR RECORDING MANUFACTURE ANOMALY DATA RELATED TO TYPE, SEVERITY, AND POSITION WITH A WIRELESS PROBE

(75) Inventors: Samuel Francis Pedigo, Lake Forest Park, WA (US); Brice A. Johnson, Federal Way, WA (US); Craig Farris Battles, Seattle, WA (US); Donald L. Kaiser, Kent, WA (US); Kimberly Jyl Kaiser, Kent, WA (US); Richard Neil Blair, Kent, WA (US); Winfeng Li, Renton, WA (US); James M. Cobb, Burien, WA (US); Matthew W. Smith, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 315 days.

(21) Appl. No.: 13/215,913

(22) Filed: Aug. 23, 2011

(65) Prior Publication Data

US 2013/0054176 A1 Feb. 28, 2013

(51) Int. Cl.
*G01B 5/008* (2006.01)
*G06F 17/40* (2006.01)
(Continued)

(52) U.S. Cl.
CPC .............. *B64F 5/0045* (2013.01); *G06F 17/40* (2013.01); *G06F 19/00* (2013.01); *G01B 5/008* (2013.01); *G06Q 10/06* (2013.01); *G06Q 50/04* (2013.01)

(58) Field of Classification Search
CPC ............ G01B 3/00; G01B 5/00; G01B 5/004; G01B 5/008; G01B 7/00; G01B 7/004; G01B 7/008; G01B 11/00; G01D 7/00; G01D 9/00; G01D 21/00; G05B 19/00; G05B 19/02; G05B 19/418; G05B 23/00; G05B 23/02; G05B 23/0205; G05B 23/0259; G05B 23/0264; G05B 2219/00; G05B 2219/30; G05B 2219/32; G05B 2219/32177; G05B 2219/32249; G05B 2219/33; G05B 2219/33128; G05B 2219/40; G05B 2219/40543; G06F 11/00; G06F 11/30; G06F 11/32; G06F 11/34; G06F 15/00; G06F 15/16; G06F 17/00; G06F 17/10; G06F 17/40; G06F 17/90

USPC ............ 702/36, 150, 185, 108, 1, 33, 34, 35, 702/38, 39, 40, 127, 182, 187, 189; 324/534, 718, 500, 512, 600, 649, 691, 324/713, 715; 714/E11.025, E11.001, 714/E11.021, E11.022; 901/1–10, 14–18; 33/1 R, 1 BB, 1 CC, 501, 503, 504, 559, 33/700; 73/1.01, 432.1, 865.8, 865.9, 73/866.3; 181/125; 250/306, 307; 356/3, 356/3.13, 237.1, 237.2, 614, 615, 623; 367/118, 124, 129; 382/100, 106, 141, 382/152; 708/100, 105, 200

See application file for complete search history.

(56) References Cited

U.S. PATENT DOCUMENTS 4,470,122 A 9/1984 Sarr
4,790,651 A * 12/1988 Brown et al. ................ 356/4.09
(Continued)

OTHER PUBLICATIONS

Yasuo Yamashita; Nobumasa Suzuki; Masamitsu Oshima; and Yoshiomi Yamaguchi "Three-Dimensional Stereometric Measurement System Using Optical Scanners, Cylindrical Lenses, and Line Sensors", Proc. SPIE 0361, Biostereometrics '82, 67 (Jul. 12, 1983); doi:10.1117/12.966000; http://dx.doi.org/10.1117/12.966000.*

*Primary Examiner* — Edward Cosimano
(74) *Attorney, Agent, or Firm* — Armsttrong Teasdale LLP (57) ABSTRACT

An anomaly detection and cataloging system is described that includes a handheld probe having a probe tip, a user interface, and a communications interface. The system further includes a system controller and a probe locating device. The probe is operable, via the user interface, for transmitting, via the communications interface, a user selected anomaly type to the system controller, the anomaly type being associated with a manufactured part or airplane on the ground (AOG). The probe locating device is operable to provide to the system controller a location associated with the probe tip, and the system is programmed to associate the user selected anomaly type with the location associated with the probe tip.

20 Claims, 6 Drawing Sheets

(51) Int. Cl.
  *G06F 19/00* (2011.01)
  *B64F 5/00* (2006.01)
  *G06Q 10/06* (2012.01)
  *G06Q 50/04* (2012.01)

(56) References Cited

U.S. PATENT DOCUMENTS

| | | | | |
|---|---|---|---|---|
| 5,196,900 | A * | 3/1993 | Pettersen | 356/141.4 |
| 6,195,618 | B1 * | 2/2001 | Rosenberg et al. | 702/152 |
| 6,408,253 | B2 * | 6/2002 | Rosenberg et al. | 702/95 |
| 6,611,141 | B1 * | 8/2003 | Schulz et al. | 324/226 |
| 6,641,535 | B2 | 11/2003 | Buschke et al. | |
| 6,728,582 | B1 * | 4/2004 | Wallack | 700/64 |
| 6,734,687 | B1 * | 5/2004 | Ishitani et al. | 324/750.19 |
| 7,007,038 | B1 * | 2/2006 | Kazemi | 1/1 |
| 7,508,971 | B2 | 3/2009 | Vaccaro et al. | |
| 7,743,660 | B2 | 6/2010 | Marsh et al. | |
| 2001/0005815 | A1 * | 6/2001 | Rosenberg et al. | 702/95 |
| 2006/0101927 | A1 * | 5/2006 | Blakeley, III | 73/866.1 |
| 2006/0288756 | A1 * | 12/2006 | De Meurechy | 73/1.01 |
| 2008/0140356 | A1 * | 6/2008 | Sanford et al. | 702/188 |
| 2009/0118858 | A1 * | 5/2009 | Wallace et al. | 700/110 |
| 2011/0166824 | A1 * | 7/2011 | Haisty et al. | 702/157 |

\* cited by examiner

CATALOGING SYSTEM FOR RECORDING MANUFACTURE ANOMALY DATA RELATED TO TYPE, SEVERITY, AND POSITION WITH A WIRELESS PROBE

BACKGROUND

The field of the disclosure relates generally to inspection of manufactured components and systems, and more specifically, to systems and methods for automated manufacturing anomaly location and classification.

There is currently no automated method for collection of both location data and visual classification data for manufacturing anomalies or aircraft on ground (AOG) inconsistencies that occur during aircraft use. Typically, this data is obtained by simple visual inspection. In some cases, the visually obtained data is used immediately to repair the anomaly. However, the observation may not be recorded for long-term tracking or statistical process control. In addition, when the data is collected visually, the exact location of the anomaly is approximated by the human inspector. Collecting sufficient data to accurately characterize manufacturing anomalies and/or inconsistencies with respect to an object during manufacturing processes is expensive and time consuming.

Moreover, users would have to accurately measure and record the location, type, severity and disposition of anomalies to generate any meaningful data. In the typical manufacturing process, however, the users simply repair the anomaly manually with no data collected, for example, for location, severity and type. When data is managed to be collected, it is typically entered manually into paper forms or logbooks. Multiple users keep multiple logbooks or fill multiple forms, one for each anomaly. There is no process in place for accumulating the form/logbook data.

However, if the data were collected it would go a long way in improving existing processes by determining trends in anomaly occurrence locations, types or other common factors. In certain instances, automated repair of these manufacturing anomalies might be enabled.

BRIEF DESCRIPTION

In one aspect, an anomaly detection and cataloging system is provided. The system includes a handheld probe that includes a probe tip, a user interface, and a communications interface. The system further includes a system controller and a probe locating device. The probe is operable, via the user interface, for transmitting, via the communications interface, a user selected anomaly type to the system controller, the anomaly type being associated with a manufactured part and the probe locating device is operable to provide to the system controller a location associated with the probe tip. The system is programmed to associate the user selected anomaly type with the location associated with the probe tip.

In another aspect, a method for recording and tracking one or both of manufacturing anomalies and inconsistencies that accrue through use with respect to a part, manufacturing anomalies and such inconsistencies collectively referred to as anomalies is provided. The method includes visually verifying that an anomaly exists within a part, touching a tip of a probe to the anomaly, operating the probe to uniquely identify the anomaly, transmitting, from the probe, the unique identification, determining a position of the probe tip, and associating the uniquely identified anomaly with the determined probe tip position within a computer database.

In still another aspect, a handheld probe for an anomaly detection and cataloging system is provided. The probe includes a user interface having a display and at least one user input device, and a communications interface. The user interface is operable, via the display and at least one user input device, for display and user selection of one of a plurality of manufacturing anomaly types. The communications interface is operable for transmitting data indicative of the user selected manufacturing anomaly type to an external device.

The features, functions, and advantages that have been discussed can be achieved independently in various embodiments or may be combined in yet other embodiments further details of which can be seen with reference to the following description and drawings.

DETAILED DESCRIPTION

The described embodiments can generally be described as having up to four components: (1) a probe and metrology system to locate and characterize attributes of manufacturing anomalies or inconsistencies with respect to an object; (2) an external system to collect location and classification data from one or more probes, aggregate the data with that from other sensors and store it in a database; (3) a computer for presenting the data about the anomalies or required rework to users to coordinate their activities and track changes as rework progresses, and (4) a process for using the stored data to affect automatic or a combination of manual and automated repair of located anomalies.

When repair includes manual and automated intervention, updates to status and extent of the inconsistencies can be communicated to modify the automated programs that complete the repairs. When the collected data indicates a recurring problem (e.g., a recurring anomaly in a particular location), manufacturing processes can be updated in an attempt to prevent future occurrences. Such a system would also provide an ability to coordinate the activities of groups of technicians during the inspection or repair process of large objects. For processes like Automated Fiber Placement (AFP) the collected data can be used directly by the AFP equipment to rework some of the inconsistencies and to prevent the occurrence of similar anomalies in future manufacturing.

In one embodiment, technical effects of the methods, systems, and computer-readable media described herein are related to a method for recording and tracking manufacturing anomalies with respect to a manufactured part and include at least one of: (a) visually verifying that a manufacturing anomaly exists within a part, (b) touching a tip of a probe to the manufacturing anomaly, (c) operating the probe to uniquely identify the manufacturing anomaly, (d) transmitting, from the probe, the unique identification, (e) determining a position of the probe tip, and (f) associating the uniquely identified manufacturing anomaly with the determined probe tip position within a computer database.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 1:
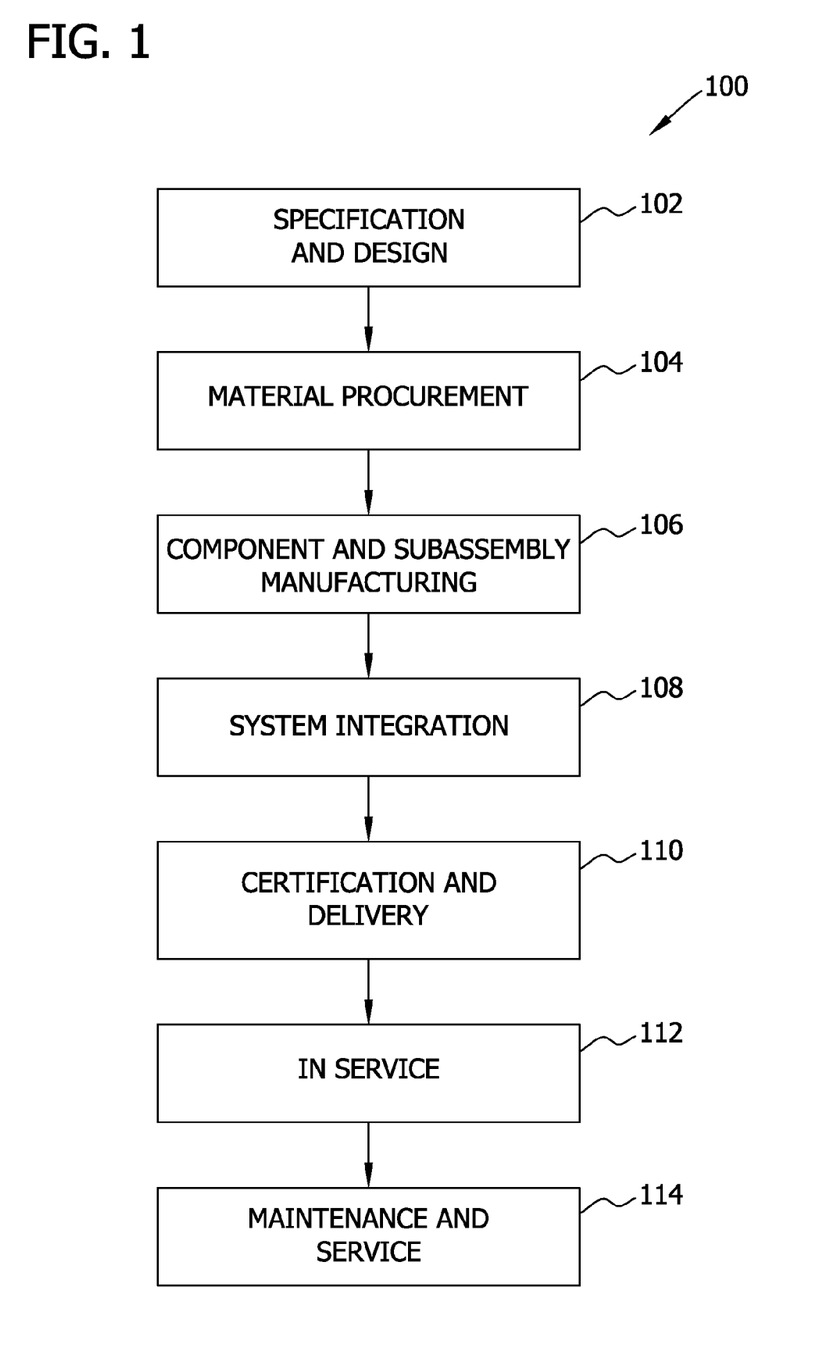
FIG. 1 is a flow diagram of an aircraft production and service methodology.
Figure 2:
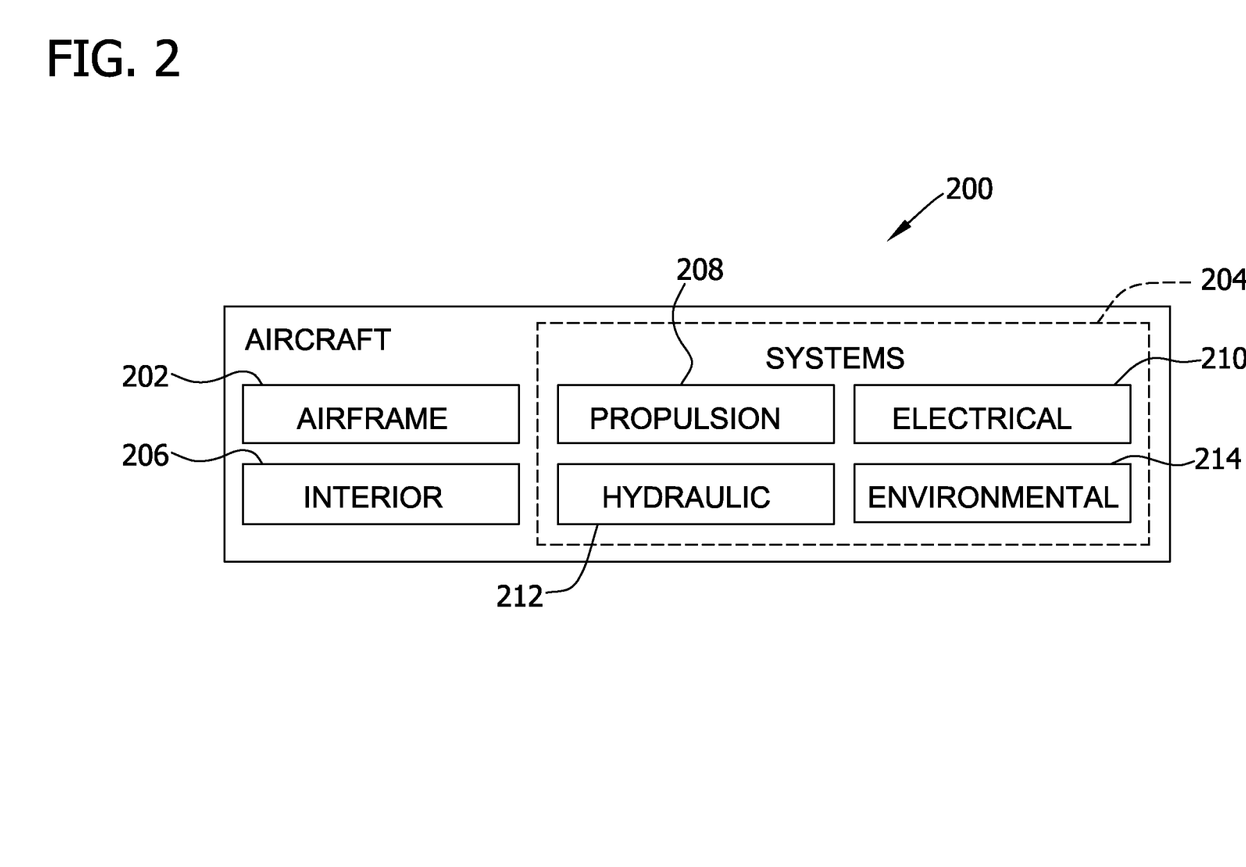
FIG. 2 is a block diagram of an aircraft.

Referring more particularly to the drawings, embodiments of the disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service 114 may be used during system integration 108 and/or maintenance and service 114 to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
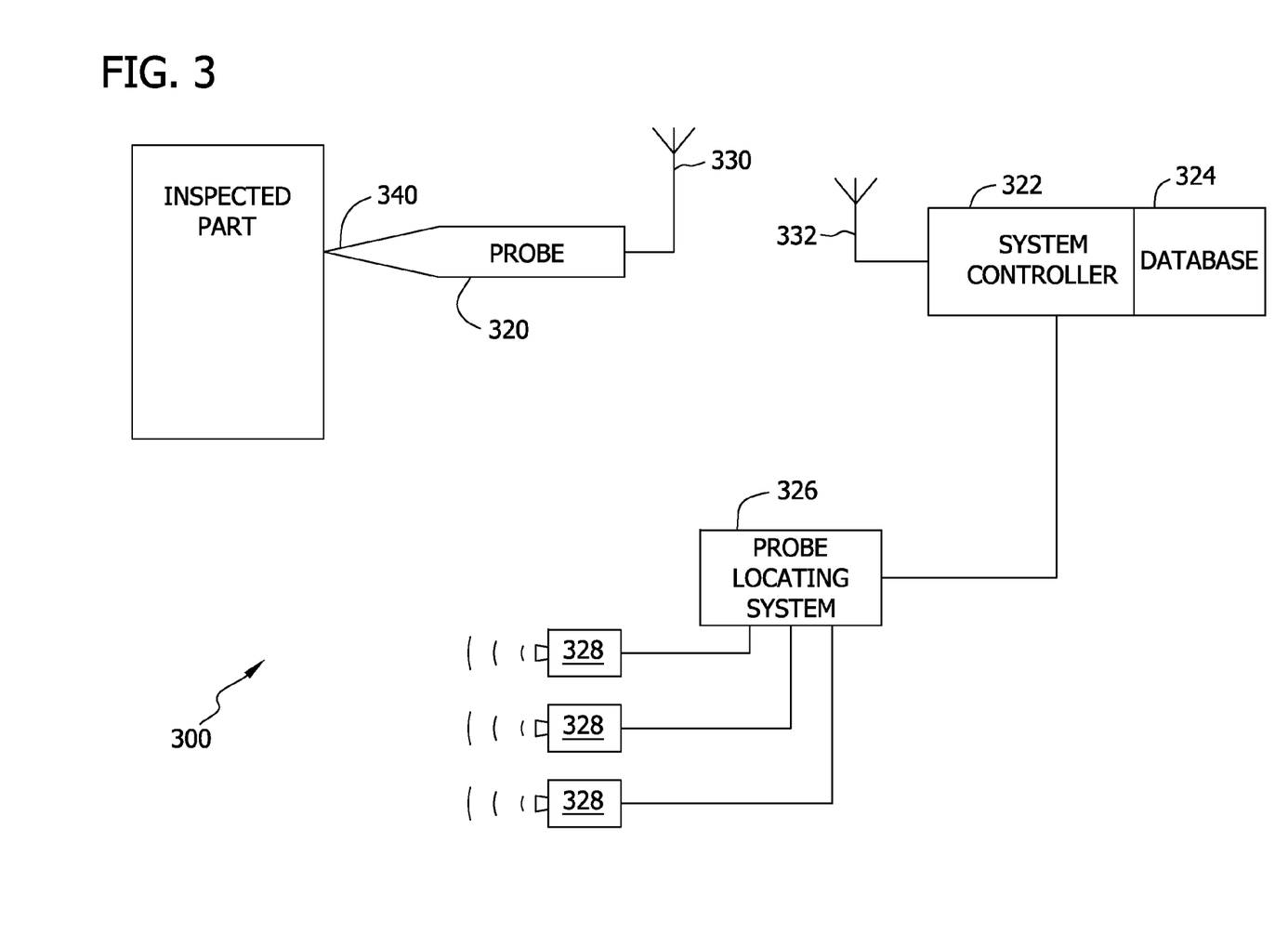
FIG. 3 is a simplified block diagram of a system for automated anomaly location and classification.

FIG. 3 is block diagram of a system 300 for locating and recording manufacturing anomalies detected during inspection of a manufactured part 302. System 300, in the illustrated embodiment, includes a probe 320, a system controller 322, database 324 and a probe locating system 326 that includes a plurality of probe sensors 328, for example, laser or computer vision devices. In one embodiment, probe 320 communicates with system controller 322 through a wireless interface depicted by antennas 330 and 332. As further explained below, probe 320 is operable to communicate to system controller 322, a manufacturing anomaly type found in the manufactured part 302.

In one embodiment, computer vision or lasers are utilized to locate the probe tip 340. In the embodiment, the antennas 330 operate as a computer vision target, though in alternative embodiments another portion of probe 320 may be utilized as the computer vision target. In the embodiment, a position of a tip 340 of probe 320 can be determined, for example, through triangulation as the probe sensors 328 of a probe locating system 326 are positioned in a coordinate system with respect to probe 320. In such embodiments, based on the varying distances from each vision or laser source to the computer vision target(s), a position of the tip 340 of the probe 320 and therefore a location of the manufacturing anomaly can be calculated.

In an alternative embodiment, probe 320 is communicatively coupled to probe locating system 326 which incorporates a plurality of probe sensors 328 utilized to determine a position of a tip 340 of probe 320 can be determined, for example, through time of flight triangulation. Sensors 328 are positioned in a coordinate system with respect to probe 320, receive the transmissions from probe 320 via antennas (rather than vision), and in one embodiment based on the slightly varying times of receipt at each sensor 328, a position of the tip 340 of the probe 320 and therefore a location of the manufacturing anomaly can be calculated.

Figure 4:
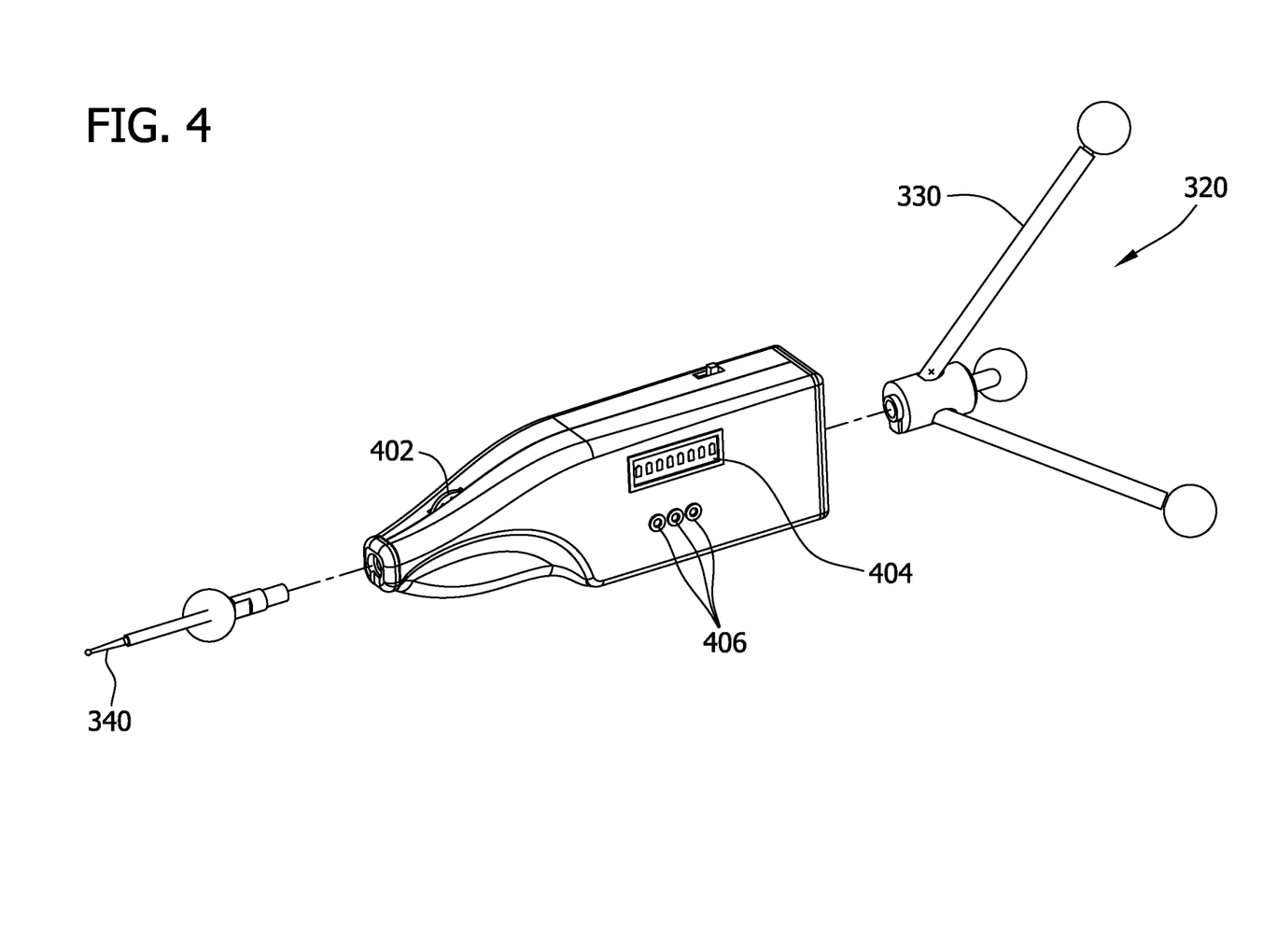
FIG. 4 is an illustration of a probe in accordance with one embodiment.

FIG. 4 is an illustration of one embodiment of probe 320 that is equipped with a button 402 for entry of user input and a digital display 404. In the illustrated embodiment three status lights 406 are shown. In the illustrated embodiment button 402 is a rotatable button that can be moved in one direction or the other. FIG. 4 also illustrates a antenna 330 and a tip 340 that are associated with probe 320. Antenna 330 and probe tip 340 are shown in exploded view. As further described herein, an inspector is able to operate probe 320, using button 402 to scroll through menus on the display 404 to select one of many types of manufacturing anomalies to be located, as described above with respect to system 300. For example, the inspector touches the probe tip 340 to a part which has just completed some kind of manufacturing operation, for example, automated fiber placement (AFP) or installation of fasteners after a drilling operation.

In use, the inspector identifies one of various types of anomalies in the manufactured part 302 through visual inspection. The inspector then scrolls through the menu on the display 404 until reaching the identified anomaly type. The inspector then touches the anomaly on the manufactured part 302 with the tip 340 of the probe 320 and button 402 on the probe 320. It should be noted that probe 320 is sometimes referred to herein as a stylus. The operation of button 402 causes a radio transmitter within the probe 320 to send a signal to system controller 322. The system controller 322 logs the type of anomaly and receives, from probe locating system 326 a measurement of the location of the anomaly based on signals received from probe sensors 328. The system controller 322 also utilizes database 324 for data management, for example, allowing users to track the existence of and disposition of the identified anomalies throughout the manufacturing process. In one example, once anomalies have been repaired, particulars in regard to these anomalies can be entered into the database 324 via the system controller 322 for long-term archiving. During manufacturing, any anomalies that have not yet been repaired can be identified by referring to the database 324. In addition, the computer logs within database 324 can be examined after several part repairs have been through the process described herein, enabling trend analysis and statistical process control (SPC).

System 300 is flexible and adaptable to different anomaly types and different processes. The following paragraphs provide examples of how system 300 and particularly probe 320 are used for inspection after two very different manufacturing operations.

The first example is a drilling and fastening operation. In this process, the inspection occurs after the holes are drilled, filled with fasteners, and nuts and fuel sealant are applied. To use the described embodiments, an inspector carries the probe 320 to the completed part 302 after the fuel sealant operation. The inspector would examine the fasteners and identify any of several anomaly types. Non-limiting examples of anomalies and inconsistencies include missing nuts, missing sealant, missing fasteners, nuts not torqued to specification, cross-threaded nuts, etc. The inspector would use the display menus on the display 404 and the button 402 to select a particular anomaly type. Then the inspector touches the tip 340 of probe 320 to the anomaly location, subsequently operating the button 402 on the probe 320. Using the location determining functions described herein, system controller 322 uses the particular location of the probe tip 340 and therefore the fastener to identify the particular fastener number from the part engineering definition. In this example, the manufactured part 302 and probe 320 share a coordinate system which allows for the probe tip 340 location to be correlated, for example, to a fastener number of the manufactured part 302. The system controller 322 logs the type of anomaly and the fastener number and tracks the disposition of the anomaly during subsequent repairs.

The second example is an automated fiber placement (AFP) operation. In this example, the inspection takes place after each ply is put down. The inspector uses the probe 320 to locate and identify any of several anomaly types. Non-limiting examples of anomalies and inconsistencies include twisted tows, folded tows, missing tows, splices, non-compacted tows, or foreign object debris. Again the operator would use the probe 320 with its menu on display 404 and button 402 to locate and therefore identify the particular anomaly type. The location of the tow where the anomaly is located is used by the system controller 322 to identify the particular tow number in the ply. For those anomaly types that require the tow to be replaced, the AFP machine replaces the tow automatically because it receives the location information from the system controller 322. This automatic replacement is not possible without the described embodiments. Typically, missing or tows that include inconsistencies are replaced by hand using adjacent tows as a placement guide. In addition, the SPC feature of the described embodiments enables the machine operators to monitor the health of the AFP equipment. If, for example, missing tows frequently occur for lane 6 on the AFP head, the operator can be alerted to check lane 6 for obstructions.

The two described examples are very different manufacturing operations but the described embodiments can be used for each. There are other types of manufacturing inspection operations that could use the described embodiments. There are also AOG applications that could use described embodiments. There is no ultrasonic or other type of inspection probe that can identify the wide variety of anomaly types that can be identified by a human operator. The disadvantage of a standalone human inspector is the lack of precision locating ability. The described embodiments combine the best of both worlds by giving the human eye a precision locating capability and the ability to relay all the information to a computer such as system controller 322 as described herein.

Figure 5:
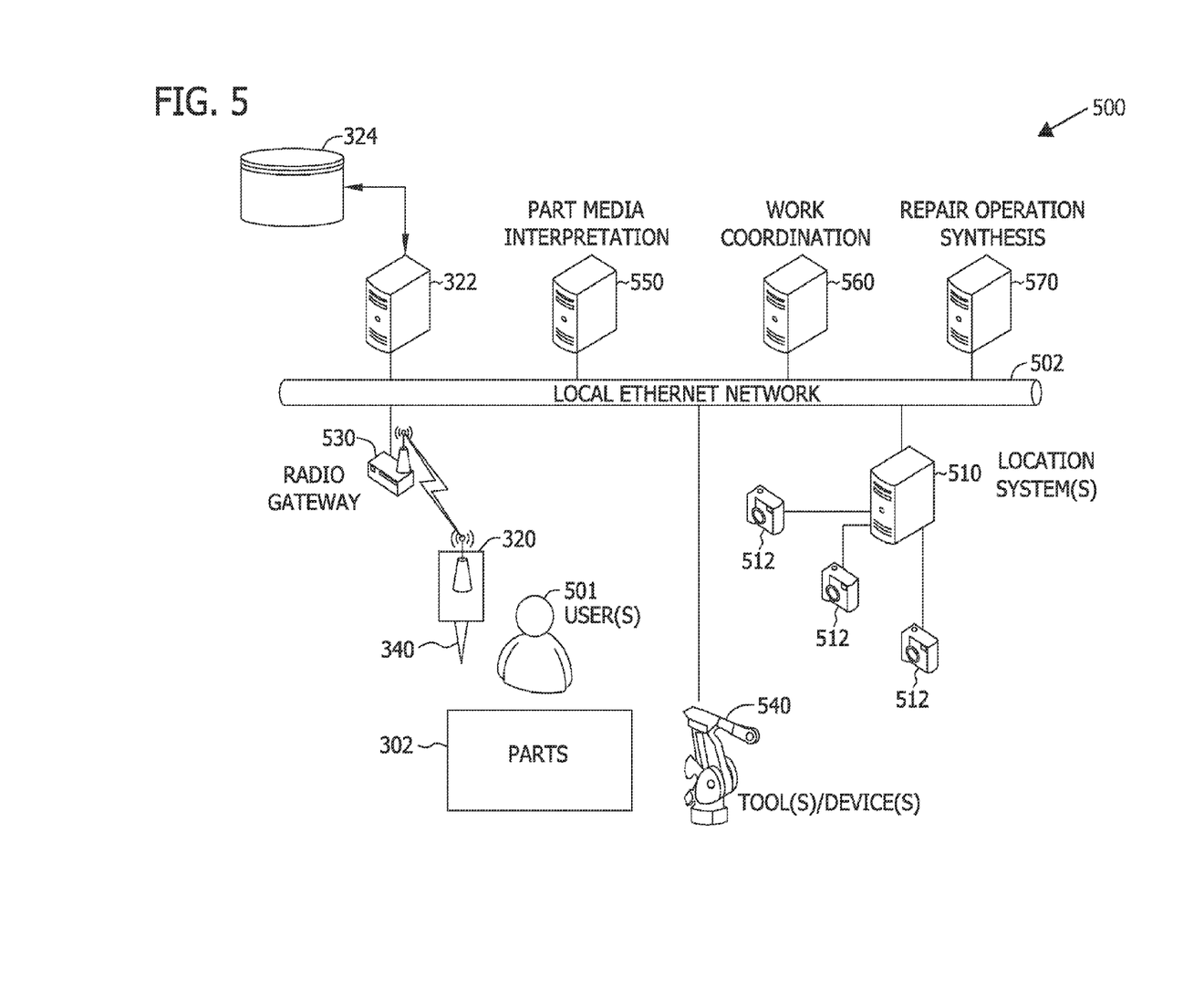
FIG. 5 is a block diagram of a networked system for automated anomaly location, classification, and repair.

FIG. 5 is a block diagram of a networked system 500 for automated anomaly location, classification, and repair. System 500 incorporates the probe 320 used by user 501, as well as master controller 322, database 324 of FIG. 3. However, the master controller 322 is but one of several computers communicatively coupled, for example, via an Ethernet network 502. It should be noted that the embodiments are not limited to an Ethernet network and network 502 is described as such for example only. Probe location system 510 is communicatively coupled to the network 502. The embodiments of FIG. 5 incorporate visual location sensors 512, to illustrate an alternative capability for tracking location of a probe tip 340. In the embodiment of FIG. 3, master controller 322 is shown as having a wireless communications capability. In the illustrated alternative embodiment, a radio gateway 530 is communicatively coupled to both the probe 320 and to the network 502, which allows for the information received by radio gateway 530 to be forwarded on to system controller 322 as well as for information originating at system controller 322 to be sent on to probe 320.

As described herein, embodiments contemplate the automated location and subsequent repair of detected anomalies, gathering of anomaly information for tracking and SPC, as well as for tracking the disposition of detected anomalies throughout the manufacturing process. Tool 540 is illustrated as being communicatively coupled to network 502, and is an example of a tool that is operatively controlled by system 500 using the information obtained by system 500 to perform anomaly repair. Part media interpretation computer 550, work coordination computer 560, and repair operation synthesis computer 570 are illustrated as being connected to the network 502 and are operably programmed to control and monitor such tasks such as anomaly tracking, SPC, and rework such as described herein.

Figure 6:
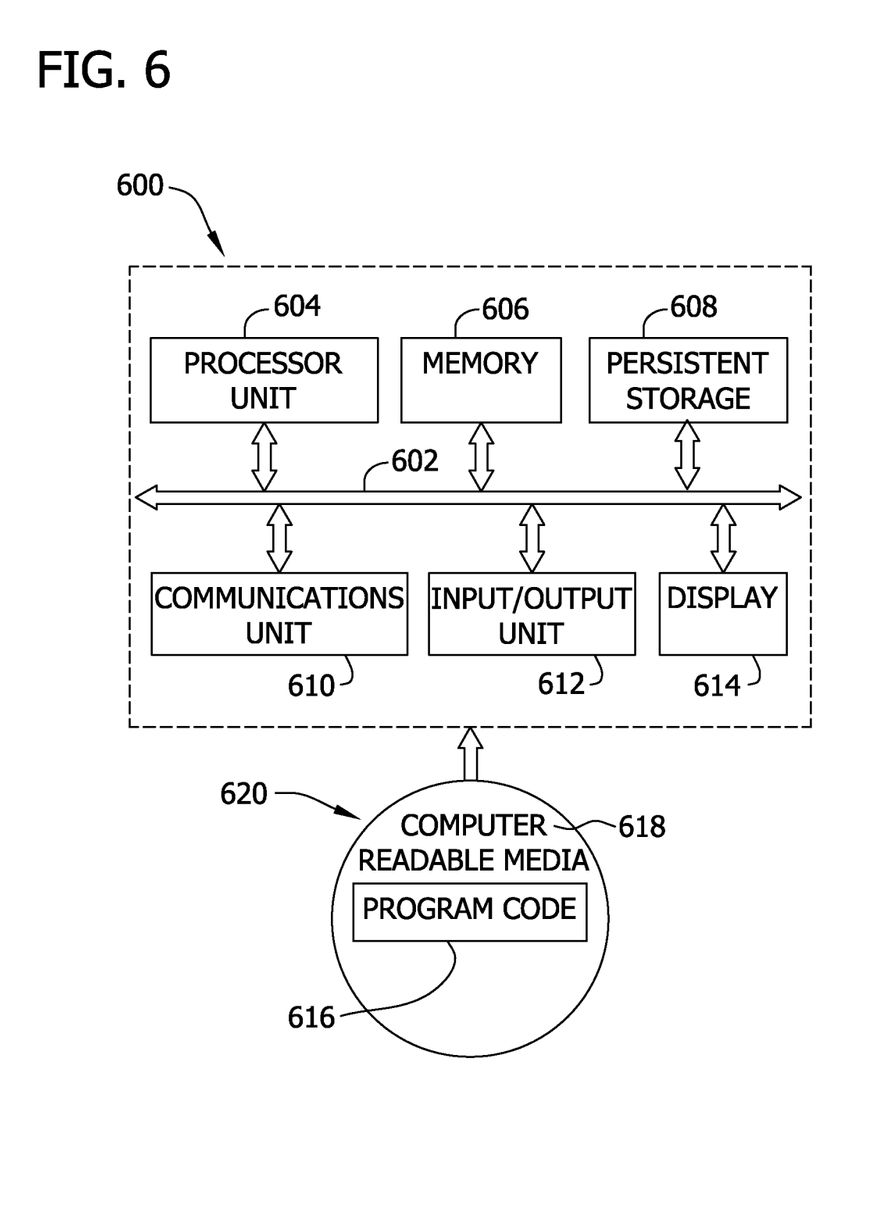
FIG. 6 is a diagram of a data processing system.

Turning now to FIG. 6, a diagram of a data processing system 600 is depicted in accordance with an illustrative embodiment. In this illustrative example, data processing system 600 includes communications fabric 602, which provides communications between processor unit 604, memory 606, persistent storage 608, communications unit 610, input/output (I/O) unit 612, and display 614. Data processing system 600 is an example architecture that might be utilized in any or all of the various computers shown in FIGS. 3 and 5. In an embodiment, system 600 might be incorporated into probe 320, as probe 320 is a so-called "smart" device, with a processing function executing a program from a memory, receiving user input, and providing both communications (via the wireless interface) and for operating a display.

With the above in mind, processor unit 604 serves to execute instructions for software that may be loaded into memory 606. Processor unit 604 may be a set of one or more processors or may be a multi-processor core, depending on the particular implementation. Further, processor unit 604 may be implemented using one or more heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices. A storage device is any piece of hardware that is capable of storing information either on a temporary basis and/or a permanent basis. Memory 606, in these examples, may be, for example, without limitation, a random access memory or any other suitable volatile or non-volatile storage device. Persistent storage 608 may take various forms depending on the particular implementation. For example, without limitation, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, without limitation, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communication links.

Input/output unit 612 allows for input and output of data with other devices that may be connected to data processing system 600. For example, without limitation, input/output unit 612 may provide a connection for user input through a keyboard and mouse. Further, input/output unit 612 may send output to a printer. Display 614 provides a mechanism to display information to a user.

Instructions for the operating system and applications or programs are located on persistent storage 608. These instructions may be loaded into memory 606 for execution by processor unit 604. The processes of the different embodiments may be performed by processor unit 604 using computer implemented instructions, which may be located in a memory, such as memory 606. These instructions are referred to as program code, computer usable program code, or computer readable program code that may be read and executed by a processor in processor unit 604. The program code in the different embodiments may be embodied on different physical or tangible computer readable media, such as memory 606 or persistent storage 608.

Program code 616 is located in a functional form on computer readable media 618 that is selectively removable and may be loaded onto or transferred to data processing system 600 for execution by processor unit 604. Program code 616 and computer readable media 618 form computer program product 620 in these examples. In one example, computer readable media 618 may be in a tangible form, such as, for example, an optical or magnetic disc that is inserted or placed into a drive or other device that is part of persistent storage 608 for transfer onto a storage device, such as a hard drive that is part of persistent storage 608. In a tangible form, computer readable media 618 also may take the form of a persistent storage, such as a hard drive, a thumb drive, or a flash memory that is connected to data processing system 600. The tangible form of computer readable media 618 is also referred to as computer recordable storage media. In some instances, computer readable media 618 may not be removable.

Alternatively, program code 616 may be transferred to data processing system 600 from computer readable media 618 through a communications link to communications unit 610 and/or through a connection to input/output unit 612. The communications link and/or the connection may be physical or wireless in the illustrative examples. The computer readable media also may take the form of non-tangible media, such as communications links or wireless transmissions containing the program code.

In some illustrative embodiments, program code 616 may be downloaded over a network to persistent storage 608 from another device or data processing system for use within data processing system 600. For instance, program code stored in a computer readable storage medium in a server data processing system may be downloaded over a network from the server to data processing system 600. The data processing system providing program code 616 may be a server computer, a client computer, or some other device capable of storing and transmitting program code 616.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown.

As one example, a storage device in data processing system 600 is any hardware apparatus that may store data. Memory 606, persistent storage 608 and computer readable media 618 are examples of storage devices in a tangible form.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 606 or a cache such as that found in an interface and memory controller hub that may be present in communications fabric 602.

The described embodiments leverage the human operator's flexibility in identifying a wide variety of anomaly types but adds the metrology and computing features to provide the location data and manage the archiving and SPC. As there are many types of anomalies that cannot be identified with automated systems and must rely on human inspectors, the described embodiments augment the human operator's ability and make his job much easier. In some applications, like AFP, the described embodiments enable automating the rework of the anomalies.

The embodiments described herein allow for automated data collection as opposed to the existing manual methods. Further, the embodiments also allow for the data to be automatically transferred to equipment capable of at least attempting the repair of identified anomalies. Finally, a system for long-term monitoring of anomaly types and anomaly location to allow for statistical process control and pattern identification which in turn will reduce the frequency of manufacturing anomalies is provided.

While the embodiments described herein are described in the context of finding, identifying, tracking, and cataloging manufacturing anomalies, the embodiments are further useful in finding, identifying, tracking, and cataloging inconsistencies that occur through use, for example, in regard to repairing airplanes on the ground (AOG) after hail damage, inconsistencies imparted onto the aircraft by other external equipment, and other inconsistencies that may accrue through use. For example, the described embodiments are capable of being deployed in the field to locate and classify inconsistencies of the type listed above (plus others) which do not occur in a manufacturing environment, but may occur after an aircraft or other such system is placed into service. In such embodiments, the inconsistency information generated through use of the described embodiments may be sent to automated equipment to affect repairs or to provide instructive data to human repair teams.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An anomaly detection and cataloging system comprising:
    a handheld probe comprising:
        a probe tip;
        a user interface configured to display a plurality of anomaly types and to receive a selection of one of the anomaly types; and
        a communications interface;
    a system controller, wherein said probe is operable, via said user interface, for transmitting, via said communications interface, the selected anomaly type to said system controller, the selected anomaly type associated with a manufactured part; and
    a probe locating device operable to provide, to said system controller, a location associated with said probe tip, said system controller programmed to associate the selected anomaly type with the location associated with said probe tip.

2. The anomaly detection and cataloging system according to claim 1 wherein said user interface of said probe comprises:
    a display; and
    at least one button operable for scrolling through the plurality of anomaly types displayed on said display, said at least one button operable for selection of one of the anomaly types and initiating a transmission of the selected anomaly type via said communications interface.

3. The anomaly detection and cataloging system according to claim 1 further comprising a database, said system controller operable to maintain within said database a catalog corresponding to detected anomalies and anomaly locations.

4. The anomaly detection and cataloging system according to claim 1 wherein said system controller comprises a system controller user interface, said system controller user interface operable for user entry of disposition data associated with one or more of the anomalies identified to said system with said handheld probe.

5. The anomaly detection and cataloging system according to claim 1 further comprising at least one machine for carrying out manufacturing of the manufactured part, said at least one machine programmed to automatically replace the portion of the manufactured part in which the anomaly was detected.

6. The anomaly detection and cataloging system according to claim 1 further comprising at least one computer communicatively coupled to a computer network to which said system controller is connected, said at least one computer programmed to control and monitor at least one of anomaly tracking, statistical process control and rework associated with the detected anomalies.

7. The anomaly detection and cataloging system according to claim 1 wherein said communications interface comprises a wireless interface.

8. The anomaly detection and cataloging system according to claim 1, wherein said system controller identifies the manufactured part based on the location of the probe tip.

9. The anomaly detection and cataloging system according to claim 1 wherein said probe locating device comprises a plurality of sensing devices placed within an area, and operable to determine the location of said probe tip.

10. The anomaly detection and cataloging system according to claim 9 wherein said probe locating device is operable to determine a location of said probe tip based on laser triangulation devices.

11. The anomaly detection and cataloging system according to claim 9 wherein said probe locating device is operable to determine a location of said probe tip based on inputs received from a plurality of optical sensing devices positioned in a coordinate system with respect to said probe.

12. The anomaly detection and cataloging system according to claim 9 wherein said sensing devices, said probe, and the manufactured part share a coordinate system.

13. A method for recording and tracking one or both of manufacturing anomalies and inconsistencies that accrue through use with respect to a part, manufacturing anomalies and such inconsistencies collectively referred to as anomalies, said method comprising:
    visually verifying that an anomaly exists within a part;
    touching a tip of a probe to the anomaly;
    operating the probe to uniquely identify the anomaly by selecting one of a plurality of anomaly types displayed by the probe;
    determining a position of the probe tip at a point where the part was touched by the probe tip; and
    storing the uniquely identified anomaly with the determined probe tip position.

14. The method according to claim 13 further comprising:
    using a user interface on the probe to scroll through a plurality of anomaly types; and
    selecting the identified anomaly type through the user interface to initiate the transmission from the probe.

15. The method according to claim 13 further comprising maintaining a catalog within the database, the catalog corresponding to detected anomalies and anomaly locations to provide statistical process control.

16. The method according to claim 15 further comprising entering, via a user interface, disposition data associated with one or more of the anomalies within the catalog.

17. The method according to claim 14 wherein determining a position of the probe comprises receiving data from a plurality of sensing devices placed within an area proximate the probe, data from the sensing devices usable to determine the location of the probe tip.

18. The method according to claim 17 further comprising at least one of:
    determining a location of the probe tip based on laser triangulation devices; and
    determining a location of the probe tip based on a time difference message transmissions originating from the probe are received by each of the plurality of sensing devices.

19. The method according to claim 13 further comprising automatically replacing the portion of the manufactured part in which the uniquely identified anomaly was detected.

20. A handheld probe for an anomaly detection and cataloging system, said probe comprising:
- a probe tip;
- a user interface comprising a display and at least one user input device, said user interface configured to display, via said display, a plurality of manufacturing anomaly types, and to receive, via said at least one user input device, a user selection of one of the plurality of manufacturing anomaly types;
- a communications interface configured to transmit data indicative of the user selected manufacturing anomaly type to an external device; and
- a transmitter that sends location data associated with a location of a detected anomaly, wherein the location of the detected anomaly is based on where the probe tip contacts a surface of a part.

* * * * *